(12) United States Patent
O'Dwyer

(10) Patent No.: US 6,889,935 B2
(45) Date of Patent: May 10, 2005

(54) DIRECTIONAL CONTROL OF MISSILES

(75) Inventor: James Michael O'Dwyer, Brisbane (AU)

(73) Assignee: Metal Storm Limited, Queensland (AU)

( * ) Notice: Subject to any disclaimer, the term of this patent is extended or adjusted under 35 U.S.C. 154(b) by 0 days.

(21) Appl. No.: 10/296,283

(22) PCT Filed: May 25, 2001

(86) PCT No.: PCT/AU01/00607

§ 371 (c)(1),
(2), (4) Date: Nov. 22, 2002

(87) PCT Pub. No.: WO01/90682

PCT Pub. Date: Nov. 29, 2001

(65) Prior Publication Data

US 2003/0122032 A1 Jul. 3, 2003

(30) Foreign Application Priority Data

May 25, 2000 (AU) .............................. PQ7763

(51) Int. Cl.[7] .............................. F42B 10/60; F41G 9/00
(52) U.S. Cl. ...................... 244/3.21; 244/3.1; 102/439; 102/473; 102/501
(58) Field of Search ..................... 244/3.1–3.3; 89/1.11; 102/374–381, 430, 439, 473–529

(56) References Cited

U.S. PATENT DOCUMENTS

| 3,398,916 A |   | 8/1968 | Van Vye et al. |   |
|---|---|---|---|---|
| 3,860,199 A |   | 1/1975 | Dunne |   |
| 3,977,629 A | * | 8/1976 | Tubeuf | 244/3.22 |
| 4,009,661 A | * | 3/1977 | Dodd | 102/480 |
| 4,408,735 A | * | 10/1983 | Metz | 244/3.22 |
| 4,463,921 A | * | 8/1984 | Metz | 244/3.22 |
| 4,482,107 A | * | 11/1984 | Metz | 244/3.22 |
| 4,555,971 A | * | 12/1985 | Romer et al. | 89/1.11 |
| 5,647,558 A |   | 7/1997 | Linick |   |
| 5,695,152 A | * | 12/1997 | Levy | 244/3.13 |
| 5,836,540 A | * | 11/1998 | Romer et al. | 244/3.16 |
| 6,138,945 A | * | 10/2000 | Biggers et al. | 244/3.22 |
| 6,178,741 B1 | * | 1/2001 | Nelson et al. | 244/3.22 |
| 6,279,482 B1 | * | 8/2001 | Smith et al. | 102/374 |
| 6,347,763 B1 | * | 2/2002 | Harkins et al. | 244/3.21 |
| 6,367,735 B1 | * | 4/2002 | Folsom et al. | 244/3.22 |

FOREIGN PATENT DOCUMENTS

| SE | 520694 C2 | * | 8/2003 | .......... F42B/10/60 |
|---|---|---|---|---|
| WO | WO 94/20809 A1 |  | 9/1994 |  |
| WO | WO 97/04281 A1 |  | 2/1997 |  |
| WO | WO 00/52414 A1 |  | 9/2000 |  |

OTHER PUBLICATIONS

Bofors Ab; "Impulse Device for In–Flight Correction of Trajectory of Shell of Other Projectile"; Derwent Abstract Accession No. 1999–589234/50, Abstract of SE 9800575 A, Aug. 26, 1998.

* cited by examiner

Primary Examiner—Bernarr E. Gregory
(74) Attorney, Agent, or Firm—Finnegan, Henderson, Farabow, Garrett & Dunner, L.L.P.

(57) ABSTRACT

A missile includes one or more arrays of barrel assemblies that are displaced from the centre of gravity of missile. Each barrel assembly includes a plurality of projectiles axially disposed within a barrel, and each projectile is associated with a discrete propellant charge for propelling the projectile sequentially from the barrel. Each array of barrel assemblies is capable of selectively firing the projectiles from selected barrels, whereby the missile is accelerated by the reactionary force generated by said firing of projectiles and the missile is deflected onto a new course or trajectory. This enables the missile to be steered to intercept its target, even if the target is undertaking evasive manoeuvres. Each barrel assembly may include multiple projectiles.

12 Claims, 1 Drawing Sheet

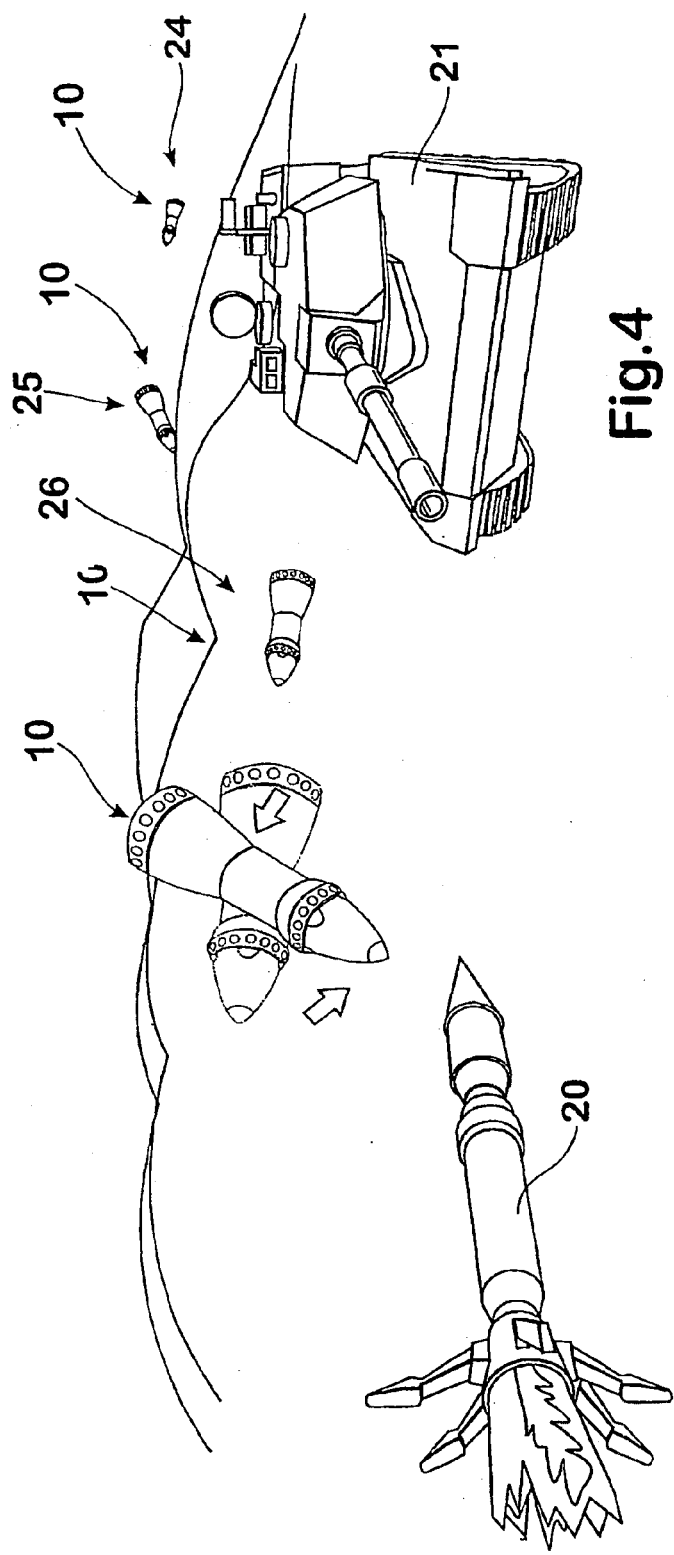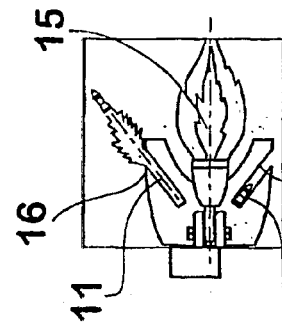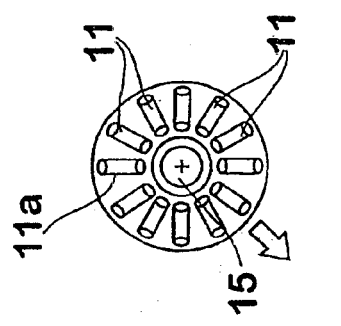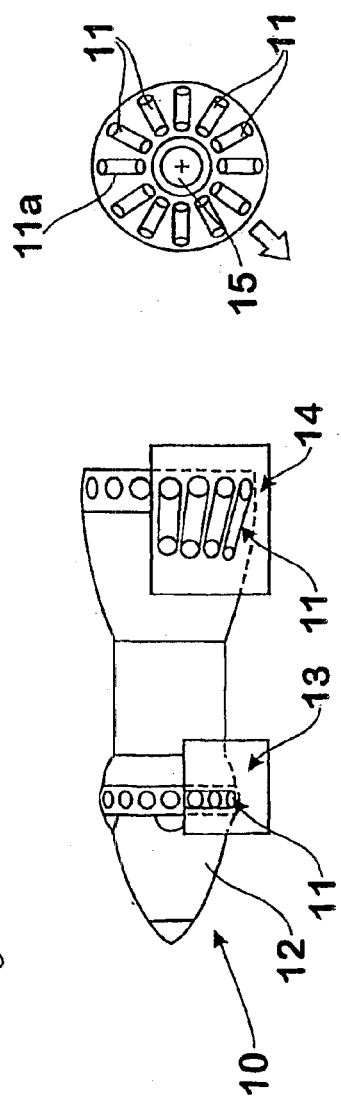

DIRECTIONAL CONTROL OF MISSILES

CROSS REFERENCE TO RELATED APPLICATIONS

This application is a national phase application based on PCT/AU01/00607, filed May 25, 2001, the content of which is incorporated herein by reference, and claims the priority of Australian Patent Application No. PQ 7763, filed May 25, 2000, the content of which is incorporated herein by reference.

BACKGROUND OF THE INVENTION

1. Field of the Invention

The present invention relates to directional control of missiles. In particular the present invention relates to missiles capable of directional control and to a process of directionally controlling a missile.

2. Discussion of the Background Art

Missiles are objects that can be propelled or shot, towards a target. Missiles include a variety of objects, many of which will be applicable to the present invention. For example, missiles such as high altitude ballistic missiles or out of atmosphere ballistic missiles are widely employed as long-range strike weapons as they are very effective and difficult to detect in time for adequate defences to be actioned. High altitude ballistic missiles may be required to make swift corrections to flight paths in order to avoid attack, such as from directionally controlled missiles.

Directionally controlled missiles that are employed to defend against incoming missiles require pinpoint position accuracy in order to intercept an incoming missile that may be able to change its direction as a defence against the incoming missile. Even if defences are actioned early, the size of the target and the relative approach speed of the defensive missile makes any late correction of flight path difficult and limits the chances of defensive missiles making a direct hit. Directionally controlled missiles may be required to make rapid changes to their flight paths in order to intercept their target.

Propelled missiles, such as ground-to-air, sea-to-air, air-to-air, ground-to-sea, air-to-sea, sea-to-sea, air-to-ground, sea-to-ground and ground-to-ground, are also employed to attack targets that may make evasive manoeuvers once the incoming threat has been identified.

Additionally, missiles that are propelled from a barrel by the detonation of a propellant charge may be required to make rapid directional changes to ensure that they hit their targets.

SUMMARY OF THE INVENTION

We have now found a directional control system that may make rapid corrections of flight path to divert a missile.

According to the present invention there is provided a missile including an array of barrel assemblies, each barrel assembly having a plurality of projectiles axially disposed within a barrel, which projectiles are associated with discrete propellant charges for propelling said projectiles sequentially from the barrel, wherein said array of barrel assemblies is capable of selectively firing the projectiles from selected barrels whereby said missile is accelerated by the reactionary force generated by said firing of projectiles.

In one embodiment of the invention the missile may be a powered missile, such as a rocket or jet powered missile, propelled in a controlled manner towards its target. Such targets may by stationary or in motion. The present invention is particularly applicable to defensive missiles targeted onto the converging path of an incoming missile, such as a high altitude or out-of-atmosphere ballistic missiles. The present invention may also be applied to in-atmosphere missiles that may advantageously have aerofoils to aid lift in lift and/or stability.

The present invention is also applicable to missiles that are propelled from a barrel by the detonation of a propellant charge, such as high caliber projectiles.

The present invention may take particular advantage of barrel assemblies of the type described in the present inventor's earlier International Patent Application Nos. PCT/AU94/00124 and PCT/AU96/00459. Such barrel assemblies include a barrel, a plurality of projectiles axially disposed within the barrel for operative sealing engagement with the bore of the barrel, and discrete propellant charges for propelling respective projectiles sequentially through the muzzle of the barrel.

The overall shape of the projectile is not narrowly critical, as the projectile is a mass against which the propellant acts and exerts a reactionary force on the breech of the barrel. In the context of the present invention the breech may be formed by subsequent projectiles remaining in the barrel in sealing engagement with the bore of the barrel. The reactionary force is transferred from the breech of the barrel to the missile and results in an acceleration of the missile.

The projectiles may be conventionally shaped, dart-like, generally spherical or any other convenient shape. The projectile may also include fins or aerofoils that may advantageously be offset to generate a stabilising spin, and/or directional lift as the dart is propelled from a barrel that may be a smooth-bored barrel.

The projectile is propelled by a charge that may be located in a propellant space and may be formed as a solid block to assist in loading the barrel assemblies. Alternatively the propellant charge may be encased and may include an embedded primer having external contact means adapted for contacting a pre-positioned electrical contact associated with the barrel. For example the primer could be provided with a sprung contact which may be retracted to enable insertion of the cased charge into the barrel and to spring out into a barrel aperture upon alignment with that aperture for operative contact with its mating barrel contact. If desired the outer case may be consumable or may chemically assist the propellant burn. Furthermore an assembly of stacked and bonded or separate cased charges and projectiles may be provided to facilitate the reloading of a barrel.

The barrel may be non-metallic and the bore of the barrel may include recesses that may fully or partly accommodate the ignition means. In this configuration the barrel may house electrical conductors which facilitate electrical communication between the control means and ignition means. This configuration may be utilised for disposable barrel assemblies that have a limited firing life and the ignition means and control wire or wires therefor can be integrally manufactured with the barrel.

A barrel assembly may alternatively include ignition apertures in the barrel and the ignition means are disposed outside the barrel and adjacent the apertures. The barrel may be surrounded by a non-metallic outer barrel which may include recesses adapted to accommodate the ignition means. The outer barrel may also house electrical conductors which facilitate electrical communication between the control means and ignition means. The outer barrel may be formed as a laminated plastics barrel which may include a printed circuit laminate for the ignition means.

The electrical ignition for sequentially igniting the propellant charges of a barrel assembly may preferably include the steps of igniting the leading propellant charge by sending an ignition signal through the stacked projectiles, and causing ignition of the leading propellant charge to arm the next propellant charge for actuation by the next ignition signal. Suitably all propellant charges inwardly from the end of a loaded barrel are disarmed by the insertion of respective insulating fuses disposed between normally closed electrical contacts.

Ignition of the propellant may be achieved electrically or ignition may utilise conventional firing pin type methods such as by using a centre-fire primer igniting the outermost projectile and controlled consequent ignition causing sequential ignition of the propellant charge of subsequent rounds. This may be achieved by calculated reaction and/or controlled rearward leakage of combustion gases or controlled burning of fuse columns extending through the projectiles or the barrel.

In another form the ignition is electronically controlled with respective propellant charges being associated with primers which are triggered by distinctive ignition signals. For example the primers in the stacked propellant charges may be sequenced for increasing pulse width ignition requirements whereby electronic controls may selectively send ignition pulses of increasing pulse widths to ignite the propellant charges sequentially in a selected time order. Preferably however the propellant charges are ignited by a set pulse width signal and burning of the leading propellant charge arms the next propellant charge for actuation by the next emitted pulse.

Suitably in such embodiments all propellant charges inwardly from the end of a loaded barrel are disarmed by the insertion of respective insulating fuses disposed between insertion of respective insulating fuses disposed between normally closed electrical contacts, the fuses being set to burn to enable the contacts to close upon transmission of a suitable triggering signal and each insulating fuse being open to a respective leading propellant charge for ignition thereby.

A number of projectiles can be fired simultaneously from a plurality of barrels or in quick succession from the one barrel. In such arrangements the electrical signal may be carried externally of the barrel or it may be carried through the superimposed projectiles which may clip on to one another to continue the electrical circuit through the barrel, or abut in electrical contact with one another. The projectiles may carry the control circuit or they may form a circuit with the barrel.

The array of barrel assemblies may be disposed radially from the center of mass of the missile. Such configurations are particularly suited to missiles that do not incorporate a propulsion system. The firing of projectiles simply displaces the missile and the missile continues upon its trajectory, save for the displacement. Whilst radially disposed arrays of barrel assemblies may also be used to advantage in missiles incorporating propulsion systems, arrays of barrel assemblies that generate a moment, or turning force, on the missile are particularly preferred. The rapid turning of the missile by the firing of the projectiles permits the attitude of the missile to be controlled whilst the missile is being propelled such as by its rocket or jet propulsion system.

The array of barrel assemblies may be arranged adjacent the leading end or the trailing end of the missile for effecting changes in attitude of the missile or medially for displacing laterally displacing the missile. Alternatively the directional control system may include an array of barrel assemblies adjacent both leading and trailing ends of the missile.

The array of barrel assemblies may fire a projectile in a direction having a longitudinal component in order to provide a consequent addition to the kinetic energy of the missile or a component in a direction tangential to the longitudinal axis of the missile in order to impart or change missile rotation about its longitudinal axis. The barrel assembly may fire across flight surfaces such as a wing to induce a further steering effect to the missile. Alternatively, the barrel assemblies may extend through the aerofoil surfaces so as to fire in both directions. This may add structural strength to the aerodynamic design.

If desired, a separate array or opposing arrays of barrel assemblies may be provided to control missile rotation about the longitudinal axis of the missile. The configuration of the arrays may include opposing pairs of barrel assemblies which are fired simultaneously to effect changes in rotation about the longitudinal axis of the missile only. The projectiles may be selectively actuated before and/or after firing projectiles from the directional control system to negate or utilize the effects on the missile of such rotation about its longitudinal axis.

In a preferred embodiment of the invention the directional control system includes a leading array of barrel assemblies disposed about the front end of the missile and from each of which a projectile may be selectively fired in a radial direction relative to the longitudinal axis of the missile and a trailing array of barrel assemblies about the rear which may be selectively fired in a direction having a radial component and a rearward component.

In certain embodiments of the present invention all the energy required to change attitude and the flight direction may be provided by the firing of projectiles from the barrel assemblies.

In certain applications a plurality of missiles of the present invention may be transported in a housing mounted on a rocket, jet or other transport to be released or fired at a target. For example missiles of the present invention may be housed in a directionally controlled missile such as that employed to defend against incoming missiles. Such missiles may themselves incorporate a divert propulsion system of the type described in the present application. For convenience we will refer to missiles for transporting missiles of the present invention as transport missiles although it will be understood that the transport missiles may themselves impact with the target.

Incoming high altitude ballistic missiles may carry up to 100 warheads, 90% of which may be decoy warheads, and on sensing the approach of a antimissile missile deploy its payload of warheads making the task of destroying the threat many fold more difficult. A transport missile carrying a multiplicity of missiles of the present invention may deploy or fire the missiles at the individual warheads. The missiles of the present invention may be directionally controlled to impact with their targets by a divert propulsion system whereby projectiles are fired from the array of barrel assemblies. The high rates of fire make this divert propulsion system viable.

For example a number of missiles may be assigned to each warhead and its direction controlled by an advanced tracking and coordination system on the transport missile that is in communication with a divert propulsion control on each missile. The divert propulsion control on each missile may then simply activate the firing of the projectiles of selected the projectiles to be fired in order to attain the desired correction to trajectory of the missile in response to instructions from the advanced tracking and coordination system on the transport missile.

Advantageously the present invention may also provide a directional control system, which will maintain or increase the kinetic energy of the missile at impact with the target. The defensive missile head may advantageously be turned side on just before predicted impact to increase the frontal area, and therefore increasing the kill probability.

In another aspect this invention resides broadly in a method of controlling the direction of a missile including selectively firing one or more projectiles from an array of barrel assemblies disposed on said missile wherein each barrel assembly of said array of barrel assemblies having a plurality of projectiles axially disposed within a barrel, which projectiles are associated with discrete propellant charges for propelling said projectiles sequentially from the barrel, wherein said array of barrel assemblies is capable of selectively firing the projectiles from selected barrels whereby the direction of said missile is controlled by the reactionary force generated by said firing of projectiles.

BRIEF DESCRIPTION OF THE DRAWINGS

In order that this invention may be more readily understood and put into practical effect reference will now be made to the accompanying drawings which illustrate a typical application of this invention, wherein:

FIG. 1 is a side view of a missile according to one aspect of this invention;

FIG. 2 is a sectional end view through the forward array of barrel assemblies in FIG. 1;

FIG. 3 is a longitudinal sectional view through the rear array of barrel assemblies in FIG. 1, and FIG. 4 illustrates the defence of a tank being attacked by a missile.

DETAILED DESCRIPTION OF THE INVENTION

The rocket powered missile 10 illustrated in FIG. 1 has a plurality of barrel assemblies 11 of the type described arranged about the front end portion 12 and forming a leading array 13 of barrel assemblies and about the tail of the missile forming a trailing array 14.

In the leading array 13, as illustrated in FIG. 2, each barrel assembly 11 is arranged radially off the longitudinal axis 15 of the missile 10, while the barrel assemblies 11 in the trailing array diverge rearwardly and outwardly and with their respective barrel axes 16 radiating from the axis 15, as illustrated in FIG. 3.

Each barrel assembly 11 contains one to twelve projectiles 17 which may be fired individually, or as a burst, at a selected rate of fire up to 500,000 rounds per second (rps). Each projectile fired will cause a reaction in the missile 10 which, if longitudinally displaced from the centre of gravity (CG) of the missile 10, will deflect the missile 10 onto a new course. If a projectile is fired from a selected barrel assembly 11a of the leading barrel array 13, the reaction will deflect the nose portion 12 in the opposite direction A, as illustrated in FIG. 2 and this will result in the missile assuming a new course.

This action may reduce the total kinetic energy of the missile. However if a projectile is fired from an opposing barrel assembly 11 in the trailing array 14, not only will the reaction be greater resulting from an applied moment, firing from the trailing array will provide a boost the kinetic energy of the missile. This effect can be used to advantage after all steering corrections have been made, by firing as many of the remaining projectiles from the trailing array 14 as is possible just before impact so as to further increase the kinetic energy of the attacking missile. The missile may simply rely on impact or be armed with a warhead.

Referring to FIG. 4 it will be seen that the defending missile 10 is shown at various positions in its controlled path to collision with an incoming missile 20 attacking a tank 21. The defending missile 10 initially may have a path, which would take it above an intercepting position. Thus at location 24, projectiles are fired upwardly from the leading array 13 and downwardly from the trailing array 14 so as to divert its course downward to location 25 where a further corresponding correction is performed.

At position 26 an opposing correction is performed to elevate the nose of the missile 10 so as to align it to a near head-on course with the incoming missile 20. Then at the last instant a further nose down correction is performed together with any sideways correction to place the defending missile onto its final collision course with the attacking missile 20. At that time the remaining rounds in the trailing array 14 which may be fired without causing the missile to move out of its collision path may be fired to increase the kinetic energy of the defending missile and thus its lethality. At or shortly after impact with a target any remaining rounds may be fired with a view to causing greater destruction of the target.

The defending missile 10 may fly a somewhat zigzag course or a ground-hugging course to its target so that it is less vulnerable to detection and/or attack.

The above has been given only by way of illustrative example of this invention and it is to be understood that all such and other modifications and variations thereto as would be apparent to persons skilled in the art are deemed to fall within the broad scope and ambit of this invention as is herein set forth.

What is claimed is:

1. A missile having a directional control system including an array of barrel assemblies from which projectiles are selectively fired, each barrel assembly having a plurality of projectiles axially disposed within a barrel and associated with respective propellant charges for propelling said projectiles sequentially from the barrel, wherein at least some of the barrels in the array of barrel assemblies are oriented to provide the respective projectiles with a component of motion along the longitudinal axis of the missile.

2. A missile as in claim 1 wherein at least some of the barrels in the array are oriented to provide the respective projectiles with components of motion both backwards along the axis of the missile and sideways away from the axis of the missile.

3. A missile as in claim 1 wherein the array includes a ring of barrel assemblies disposed circumferentially around the missile and behind the center of gravity of the missile.

4. A missile as in claim 1 wherein the array includes two rings of barrel assemblies disposed around the missile one forward and one rearward of the center of gravity of the missile.

5. A missile as in claim 1 wherein the array includes a ring of barrel assemblies disposed circumferentially around the center of gravity of the missile.

6. A missile as in claim 1 wherein the array includes one or more groups of barrel assemblies disposed in relation to the centre of gravity of the missile to alter both the attitude of the missile about the center of gravity and the trajectory of the centre of gravity.

7. A missile having a directional control system including an array of barrel assemblies from which projectiles are selectively fired, each barrel assembly having a plurality of projectiles axially disposed within a barrel and associated with respective propellant charges for propelling said projectiles sequentially from the barrel, wherein at least some of the barrels in the array are disposed substantially forward of the centre of gravity of the missile and others of the array are disposed substantially rearwards of the centre of gravity of the missile so that both the attitude and trajectory of the missile are controlled by selective firing of the projectiles.

8. A missile as in claim 7 wherein barrels in the array are disposed circumferentially around the longitudinal axis of the missile and at least some of the barrels are oriented radially from the axis.

9. A missile as in claim 7 wherein the barrels disposed rearwards of the center of gravity are oriented at an angle towards the rear of the missile.

10. A method of directional control of a missile, including:

firing projectiles from barrel assemblies located forward of the center of gravity of the missile, and firing projectiles from barrel assemblies located rearward of the center of gravity of the missile, wherein the projectiles are selected and fired to alter either or both of the attitude and trajectory of the missile.

11. A method as in claim 10 further including:

firing projectiles with a component of motion along the longitudinal axis of the missile, wherein the projectiles are selected to alter the kinetic energy of the missile.

12. A method as in claim 10 further including:

firing projectiles radially outwards from the longitudinal axis of the missile to alter the attitude of the missile.

* * * * *

UNITED STATES PATENT AND TRADEMARK OFFICE
CERTIFICATE OF CORRECTION

PATENT NO. : 6,889,935 B2
DATED : May 10, 2005
INVENTOR(S) : James Michael O'Dwyer It is certified that error appears in the above-identified patent and that said Letters Patent is hereby corrected as shown below:

Title page,
Item [57], ABSTRACT,
Line 1, "includes" should read -- including --.;
Line 2, "of missile." should read -- of the missle. --;
Line 6, "array of barrel" should read -- array of the barrel --; and
Line 9, "said firing of projectiles" should read -- the firing of the projectiles --.

Signed and Sealed this

Ninth Day of August, 2005

JON W. DUDAS
*Director of the United States Patent and Trademark Office*